Dec. 3, 1929.   S. B. GORBUTT   1,737,840
SUPPORT AND ANCHOR FOR TRACTOR HOISTS
Filed April 6, 1927   2 Sheets-Sheet 2
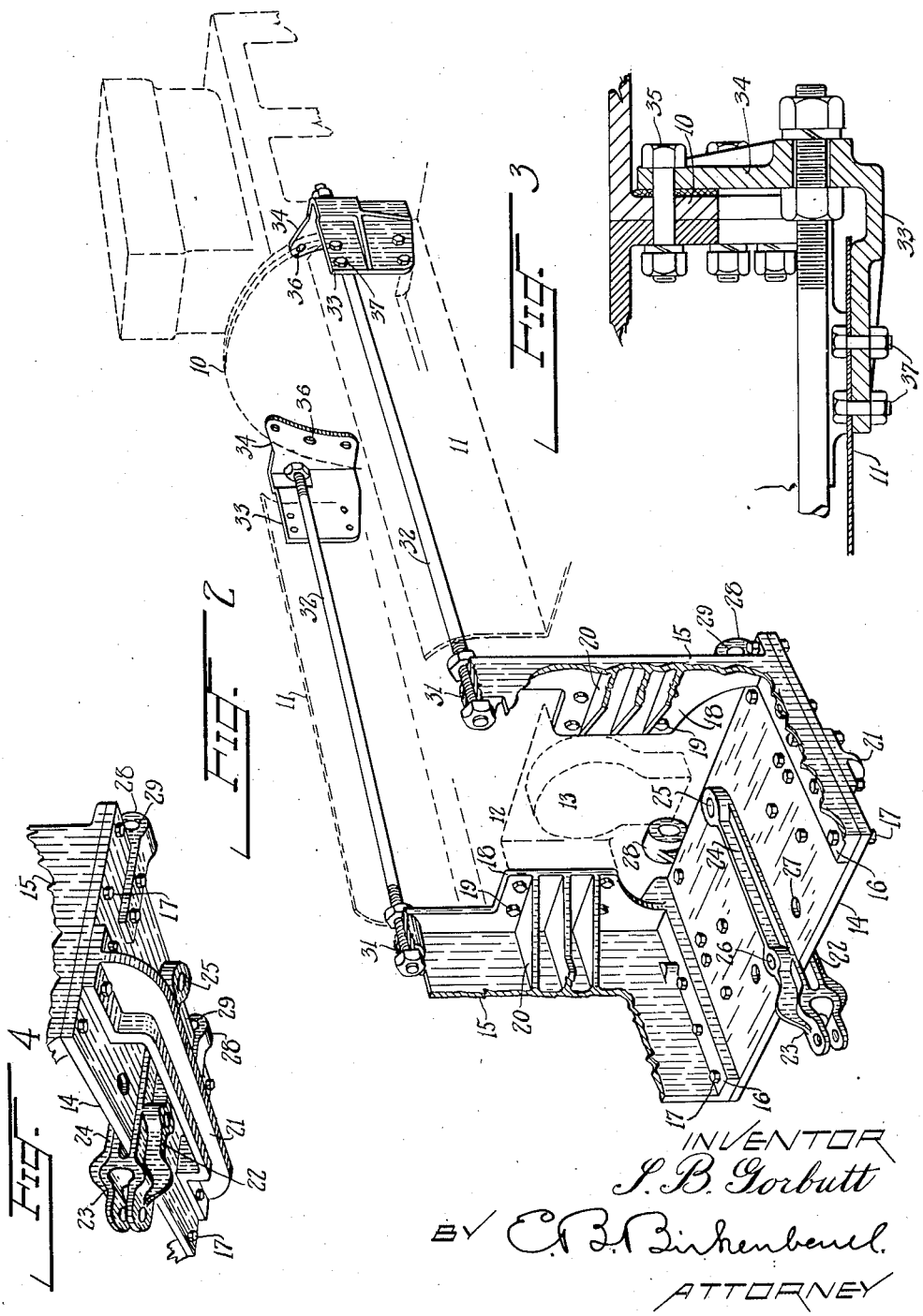
INVENTOR
S. B. Gorbutt
BY C. B. Birkenbeuel.
ATTORNEY Patented Dec. 3, 1929

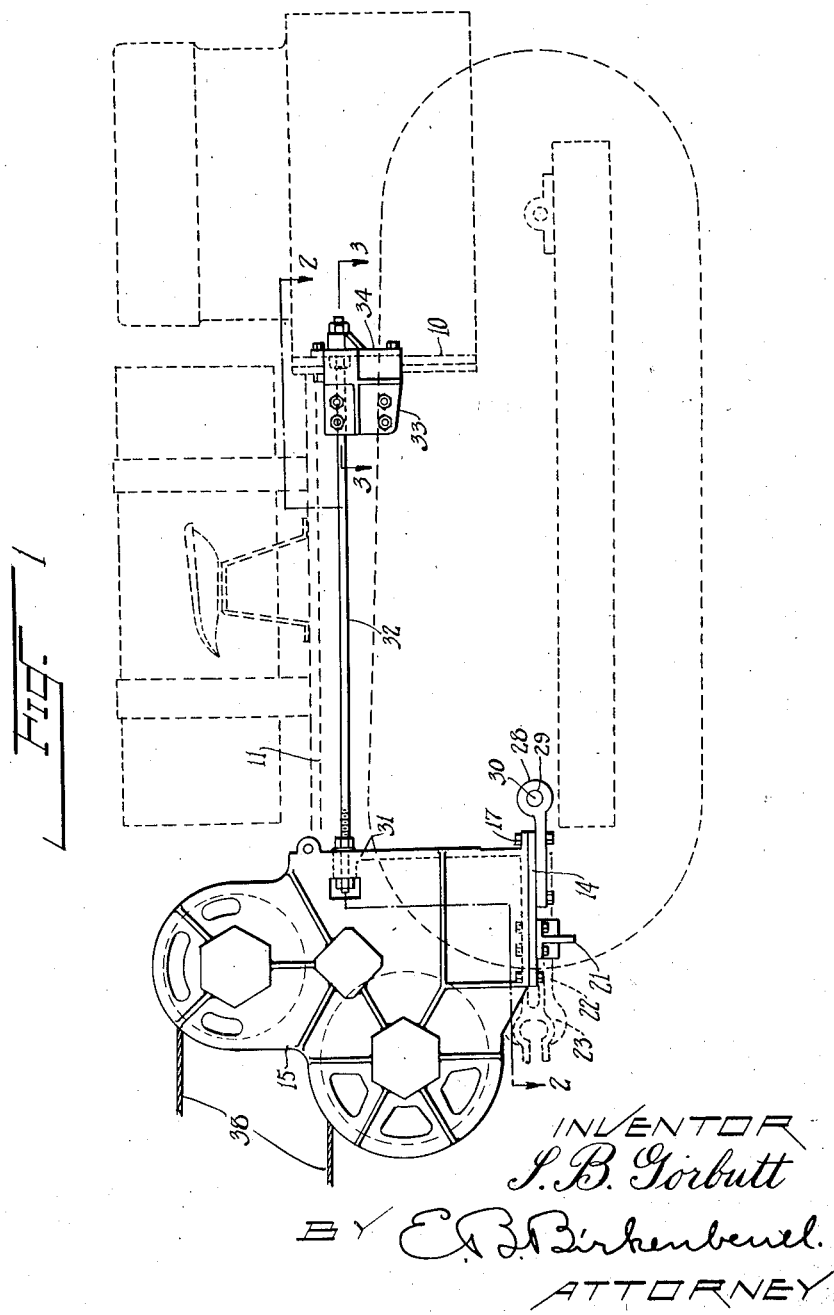

1,737,840

UNITED STATES PATENT OFFICE

SIDNEY B. GORBUTT, OF PORTLAND, OREGON, ASSIGNOR, BY MESNE ASSIGNMENTS, TO WILLAMETTE-ERSTED COMPANY, OF PORTLAND, OREGON

SUPPORT AND ANCHOR FOR TRACTOR HOISTS

Application filed April 6, 1927. Serial No. 181,381.

This invention relates generally to cable winding attachments for motor vehicles with special reference to the movable track type of tractor.

The first object of this invention is to provide a novel form of support for a cable winding hoist at the rear of a tractor and a special form of anchor whereby all strains imposed on the support will be transferred directly to such parts of the tractor as are easily capable of withstanding same in a manner that no portion of the tractor or support will be unduly stressed.

The second object is to construct a support for a hoisting apparatus such as cable winding drums which will be easy to manufacture and will require only the forming of a few holes in light fender material and the bolting of the attachment to the tractor in order to completely install same.

The third object is to so construct the hoist support and its anchor that all tension is removed from such bolts as connect the support to the crank case of the tractor, which naturally is not intended to carry any great load.

The fourth object is to so construct the anchor for the support that it will engage the forward side of the main engine flange thereby again relieving the attaching bolts of all tensile strains.

The fifth object is to provide a special form of brace under the support platform whereby the draw bar will be prevented from distorting the frame and causing undue friction in the hoist itself.

The sixth object is to provide a special form of side frame for the hoist which will add greatly to the lateral rigidity of the entire device without placing undue strains on the tractor parts.

These, and other objects, will become more apparent from the specification following as illustrated in the accompanying drawings, in which:

Figure 1 is a side elevation of a tractor of the movable track type shown in phantom and showing the hoist and its support in full lines, as well as the relation of the anchor to the hoist and tractor. Figure 2 is a perspective view of the entire hoist support—showing the two anchors and the manner in which they are secured to the tractor, taken along the line 2—2 in Figure 1. Figure 3 is a horizontal section taken along the line 3—3 in Figure 1. Figure 4 is a perspective view of the under side of the hoist support showing the brace member and draw bar.

Similar numbers of reference refer to similar parts throughout the views.

Referring in detail to the drawings, in order to illustrate this invention there is indicated the outline of a tractor and certain related parts such as the engine flange 10, the fenders 11 and the rearward end 12 of the crank case, as well as the power take off flange 13.

The device itself consists of a flat platform 14 to whose sides are bolted the upright frames 15 along their flanges 16 by means of the bolts 17. Along the back of the members 15 are formed the flanges 18 which are secured by bolts 19 to the rear end 12 of the crank case. Ribs 20 are provided between the members 15 and 18 to add lateral stiffness to the side frames.

Under the platform 14 is placed a transverse brace 21 whose central portion is spaced from the platform 14 forming a slot in which can swing the lower portion 22 of the draw bar 23. The upper portion 24 of the draw bar 23 is on the top side of the platform. The members 22 and 24 are pivotally attached to the platform 14 by the pin 25 and the pin 26 passes through both members 22 and 24 and through one of the holes 27 in the platform 14 to provide the desired draught for the vehicle.

On the under side of the platform 14 are secured the brackets 28 through whose holes 29 is passed the rear axle 30 of the tractor. Extending forwardly from the upper ends 31 of the members 15 are the anchor rods 32 whose extreme forward ends pass through the brackets 33 whose inturned sides 34 are secured to the forward side of the engine flange 10 by means of the bolts 35 which pass through the holes 36 in the members 34. The brackets 33 also secure the forward ends of the fenders 11 by means of the bolts 37.

It can be seen by this construction that if when installing this device sufficient tension is imparted to the rods 32 to remove all tension from the bolts 19 that these bolts will not be placed in tension at any time, except possibly due to an extreme lateral pull on the hoist support, which naturally would be a rare occurrence.

It can also be seen that the pulls from the lines 38 will be transferred directly through the horizontal anchor rods 32 to the strong engine flange 10 which is easily capable of withstanding any strain which the tractor is capable of handling.

In Figure 1 the driver's seat is indicated as facing the hoist, which is mounted at the rear of the tractor. It will be understood, of course, that this is only the case when the hoist is being used, the seat being made to swivel so that the driver can sit facing the front of the tractor when moving over the ground.

The words "forward" and "rearward" as used herein will be understood to refer to the natural front and rear end of the tractor instead of indicating the relation to the driver's position.

I claim:

A support and anchor for tractor hoists having, in combination, a horizontal platform provided with hinged brackets at its forward side for supporting same from the rear axle of a tractor; an upright side frame secured to each side of said platform forming a support for cable drums; underslung transverse brace members across the under sides of said frames having its mid portion spaced from said platform; a slotted draw bar having its upper portion above said platform and its lower portion above said transverse brace, said draw bar having means for adjusting its lateral position with relation to said platform; and a pair of anchor rods for securing the upper ends of said side frames to the engine of said tractor, said side frames having means for securing same against lateral movement with relation to the transmission case of a tractor.

SIDNEY B. GORBUTT.